Patented May 8, 1951

2,551,874

UNITED STATES PATENT OFFICE 2,551,874

METHOD COMPRISING COATING A WELL-DRILLING WEIGHTING MATERIAL

Baruch Cerf, Los Angeles, Calif., assignor to Graphite Frecs Company, Los Angeles, Calif.

No Drawing. Application February 27, 1946, Serial No. 650,748

1 Claim. (Cl. 252—8.5)

This invention relates to the coating and treatment of various weighty chemical particles with carbon, particularly with an unctious carbon that has an affinity for metal and metalloids and the like. The invention concerns chiefly the application of graphite to barium sulfates and the like and to the material known to the oil drilling trade as "Barytes" as well as to other kinds of substances placed in wells or well-bores to give weight to the circulatory "mud" therein.

In the drilling of wells, especially oil and gas wells, a drilling mud is circulated in the bore of the well to cool the bit and/or equipment and carry to the surface the cuttings, sand, etc. as the drilling progresses. This mud may be aqueous, or non-aqueous, that is, the circulating drilling fluid may be mud and water based, or oil based, or possibly based with some other fluid or fluids or combination thereof. When high pressure or other pressures or infiltration contingencies are encountered within the bore, the drilling fluid must be weighted to supply the static head necessary to offset and/or hold high pressure gas, oil or salt-water, etc. in the formation strata being drilled from becoming dangerous, or interfering with the complete drilling of the well.

The process of my invention pertains to and is applied to any type or composition of weighting material which is basically mineral and mineral-like materials, metal, metallin, or metalloid in nature and where graphitization is possible and an essential and expeditious step or improvement for effecting longer useful life of the well or other drilling equipment. The graphite used in combination with the weighting material is preferably in a very fine divided form; that is, sufficiently fine and levigated to pass completely through a 200 mesh screen.

This invention has for its object the production of a solidity or composite composed chiefly of two or more discrete particles; that is, solid commercial weighting materials or finely divided non-colloidal solids or granules in combination with graphite, the two unified ingredients being and forming an integral whole or composite.

One of the principal objects of this invention, therefore, is to provide a solid composite facility or weighting material which has the properties and characteristics desired in well drilling operations and which is impervious to chemical action, a product which is of non-polarity and resistive to electrolytic corrosion, passivity against impact, and thus protecting opposing metal surfaces; it has stability as against flocculation or aggregation of the particles and retains at all times the oil and/or water wettable surface necessary as a suspensoid in aqueous, non-aqueous or dissimilar mobile thixotropic fluids.

Another object of the present invention is the production of a weighting facility for oil and gas well rotary drilling, the combined particles having an unctuous, non-seizing, non-abrading, but a graphitized surface with a non-magnetic characteristic skin.

A further object of my invention is to produce an improved composite weighting material or product that may be satisfactorily used for all types of muds in well drilling which will not reduce the volumetric weight desired within the bore while drilling and which provides a weighting material having improved viscosity characteristics which are materially lowered to better circulate the "mud" within the well while drilling.

It is, therefore, a still further object of the present invention to provide for oil and gas wells, while drilling, an improved circulatory weighting material, the particles of which are primarily beneficial because of their permanent nature and ability to combat cohesion and reduce deleterious effects and friction losses and to reduce fatigue failures of steel drilling equipment at all depths while rotating in the circulating mobile thixotropic fluid down in the bore of the well.

And a still further object is the provision of a weighting material for mobile thixotropic drilling fluids and which cannot and will not cohere or its abrasive constituent rub directly against opposing equipment or steel surfaces with the clippage or shearing stress that causes detrition of and impairs the steel surfaces; a heretofore cause of replacements as is imposed by the comminuted natural solid particles of the hard irregular surfaces of weight materials now used admixed and/or suspended in mobile thixotropic drilling fluids.

Other objects, advantages and features of my invention will appear from the accompanying drawings, the subjoined detailed description, the preamble of these specifications and the appended claim.

Applicant is about to explain in detail one or more forms of his invention in order to teach one how to make and use the same, but it is to be understood that the description thereof is not to limit the invention in any sense whatsoever except as limited by the appended claim.

The natural granular surfaces of weighting substances heretofore employed, such as commercial barytes, or barite (barium sulphate) generally used as an integer of rotary circulatory drilling media, is characterized by certain obvious serious shortcomings, the principal one of which is abrasiveness, which causes a corrosive action detrimental to the subsurface equipment, and especially to the rotating drilling stem because it is in continuous contact therewith. Such common weighting material so used is undoubtedly a contributory cause of much expensive replacements.

The term "weighting material" is used herein in a generic sense and includes all heavy pulverulent or granular material as designated commercial weighting material of high specific gravity characteristic, or resembling minute metal particles in certain properties, or metallin, or metalloids, or compounds of minerals and mineral-like materials, whether they are true metal, metallin, or metalloid, intended to include such pulverulented or granulated materials such as limestone, magnetite, hematite, barite or barytes, lead compounds such as lead oxides or sulfides, iron compounds, lead concentrate, ferric oxide, mineralite etc., which are analogous to or used as weighting materials in "muds" and the like in circulatory rotary sub-surface drilling.

"Graphite," as used herein in a general sense, includes inert, unctuous, non-corrosive or non-corroding natural or artificial (electric furnace) graphite, levigated and with an average content of not less than 75% of graphitic carbon, or an in-mix of both in various proportions and of the grades available and/or graphite suspended for spraying in water, kerosene, light petroleum or some fraction thereof used as a liquid carrier or vehicle for graphite. The particles of graphite may vary in size, but a substantial portion of them should come within the particle size range up to approximately one micron maximum dimensions with inherent avid-affinity to orient upon and penetrate the irregular surfaces of the weighting solid particles and form an adequate unctuous graphite coating or glaze upon the weighting material.

The term "Mobile thixotropic fluid" relates to clayed or mud-based (aqueous), oil-based (non-aqueous) or dissimilar oil-water-clay spissated mobile fluids and more particularly to their application to rotary drilling usage, containing prerequisite thixotropy substances such as bentonite or bentonic clays or other analogous colloidal thixotropy material and/or modifying chemical substances as required functionals to cope with any drilling problems or to regulate viscosity and thus obtain a fluid of high weight per gallon which is still mobile enough to permit easy handling and pumping and yet allow for changed pressure conditions as they are encountered. The term "Bentonite," a native colloidal gel forming clay, sold under the trade commercial names "Aquagel" or "Magcogel" is used herein in a generic sense as including all clays having high thixotropy characteristics whether they are true bentonite or not and is intended to include other materials or other clays having similar thixotropy properties.

Weighting material is used in praxis in the drilling of wells where it is necessary that the hydrostatic pressure of the drilling fluid more than counterbalances the gas pressure in the bore and its surrounding structure. It is customary to increase the weight per volume of the drilling fluid by the addition thereto of comminuted materials having a high specific gravity, generally such as commercial available barytes barium-sulphate ($BaSO_4$), sold under the trade name "Baroid" and/or "Magcobar" which has a hardness of 2.5–3.5, specific gravity 4.3–4.6 of orthorhombic crystals, of uneven fracture and granular in its surface. The quantity used in a unit bore is variable and is calculated against existing pressure and thixotropy properties of the drilling fluid.

According to the present invention, I add to the thixotropic drilling fluid a solidity or composite as weighting material which may be a metal, metallin or some metalloid particles, for example, comminuted commercial barytes (barium sulphate) particles coated or glazed with graphite. A function of the graphoid coating or glaze is to smooth the rough surfaces of the granules with the slick unctuous graphite and form non-magnetic surfaces to prevent the propensity of the barytes particles from detrimental abrasion with the steel surfaces of drilling equipment. With this new and improved combination weighting material it is found that the boring rate can be materially increased and tool wear decreased, adding longer useful functioning life to the steel drill stem and cutting bit, thereby reducing costs of operative drilling.

While the principles of my invention may be applied in various ways, I prefer to in-mix, merge or coalesce a finely divided graphite having absolute affinity for metals and metal-like substances of high graphitic carbon content to adhere to commercial barytes or other commercial weighting materials not so finely divided. This merging is done within a suitable glazing tumbler barrel or mechanical baffle mixer or other suitable mechanical equipment to insure a uniform coating or glaze over and within the interstices of the weighty particle surfaces. This graphoided composite material is then shipped to the oil fields where it is added to the drilling fluid as a suspensoid through the mixer or mud-gun, or at the suction intake of the pump, or otherwise at the mouth of the well in sufficient portion to supplement weight pressure and viscousness within the drilling bore.

The graphite can successfully be applied to any of the commercial barytes or weighting material used or heretofore designated in the following manner: by in-mix or spraying the graphite by dry blast or in a colloidal or suspended form while the weighting material is agitated or tumbled, and thereafter the moisture, or carrier, or film vehicle, is evaporated or dry blown with compressed air, or by heating of the resultant composite, the graphite coating or glaze remaining firmly integrated therewith.

To insure a satisfactory coating of barytes, or other grains, with graphite it necessitates the use of a considerable excess of this latter material, which is removed later by sieving or airfloat separation. The excess graphite thus recovered is suitable for use in subsequent coating or glazing operations or for mixing with new graphite.

The barite or barytes referred to herein is intended to mean natural or mineral barite which has not been subjected to any special bleaching or chemical or similar purification or divisionals unrelated to its use as a drilling weighting material.

It is, of course, understood that various changes and modifications may be made in the details of form, mixture, compounds and texture of the whole or any part of the specifically described embodiment of this invention without departing from the spirit thereof, such changes and modifications being restricted only by the limitations clearly expressed in the following claim.

Having thus described my invention, what is claimed as new and desired to be secured by Letters Patent is:

The method of preparing a well-drilling mixture to add weight to the circulatory fluids which consists of a finely divided weighting material of about 150 mesh and a still finer divided graphite of about 350 mesh, wherein the weighting material is agitated by streams of percolating air blasts while the graphite is sprayed thereon until all the finely divided weighting material is surfaced with the graphite, then removing the excess graphite prior to bagging the mixture.

BARUCH CERF.

REFERENCES CITED

The following references are of record in the file of this patent:

UNITED STATES PATENTS

| Number | Name | Date |
|---|---|---|
| 1,575,945 | Stroud | Mar. 9, 1926 |
| 1,692,996 | Richardson | Nov. 27, 1928 |
| 1,960,899 | De Forest | May 29, 1934 |
| 2,055,666 | Moore et al. | Sept. 29, 1936 |
| 2,059,983 | Dent et al. | Nov. 3, 1936 |
| 2,216,769 | Drapeau | Oct. 8, 1940 |
| 2,258,202 | Burns | Oct. 7, 1941 |
| 2,329,878 | Cerf | Sept. 21, 1943 |

OTHER REFERENCES

New Standard Dictionary (Funk and Wagnalls) published by Funk and Wagnalls Co. of New York (1932), column 1 of page 1561.

"A Course in Powder Metallurgy," by Baeza (1943), pp. 144 and 145.